United States Patent [19]

Paredes

[11] 3,805,166

[45] Apr. 16, 1974

[54] SQUELCH CIRCUIT WITH TIME CONSTANT CONTROLLED BY SIGNAL LEVEL

[76] Inventor: Alfredo E. Paredes, 2295 N.W. 14th St., Miami, Fla. 33125

[22] Filed: Oct. 20, 1972

[21] Appl. No.: 299,269

[52] U.S. Cl. .................. 325/478, 325/480, 330/141
[51] Int. Cl. .............................................. H04b 1/10
[58] Field of Search.... 325/318, 348, 397, 402–404, 325/410, 456, 466, 473, 478, 65, 319, 479; 178/7.3; 330/141; 328/135; 343/228

[56] References Cited

UNITED STATES PATENTS

| | | | |
|---|---|---|---|
| 2,957,074 | 10/1960 | Trevor | 325/319 X |
| 3,440,543 | 4/1969 | Polzl | 325/319 X |
| 3,714,598 | 1/1973 | Wakai et al. | 325/319 X |
| 3,719,892 | 3/1973 | Yamazaki et al. | 325/478 X |
| 3,613,012 | 10/1971 | Feistel | 325/478 X |
| 3,628,058 | 12/1971 | Espe | 325/478 X |
| 3,699,457 | 10/1972 | Wright | 325/479 |

*Primary Examiner*—Robert L. Griffin
*Assistant Examiner*—A. M. Psitos
*Attorney, Agent, or Firm*—Ernest H. Schmidt

[57] ABSTRACT

A variable time constant squelch circuit for radio receivers including means for distinguishing between relatively different levels of rectified noise proportional to incoming signal strength, and operative at low input signal levels to introduce a time constant substantially greater than is introduced upon reception of an incoming signal the level or strength of which is at or greater than a certain threshold value greater than that of said low input signal levels. A voltage divider at the input of the squelch circuit feeds rectified noise at different levels to respective first and second NAND gates, the outputs of which feed distinctive potentials to respective high and low level NAND output gates. The output of the high level NAND output gate is utilized to squelch the received audio signal. The output of the first NAND gate includes an RC time delay circuit operative to be charged to energizing potential upon the reception of any signal, whether weak or strong, to provide for time delay in squelch operation. The output of the low level NAND output gate comprises a series resistor circuit operative to be connected in parallel with the discharge resistor of the above-described time delay circuit only upon the reception of a signal providing an input to said second NAND gate at or greater than said threshold value, thereby substantially shortening the squelch time delay upon the discontinuance of incoming signals having high signal strength.

6 Claims, 2 Drawing Figures

SQUELCH CIRCUIT WITH TIME CONSTANT CONTROLLED BY SIGNAL LEVEL

Figure 1:
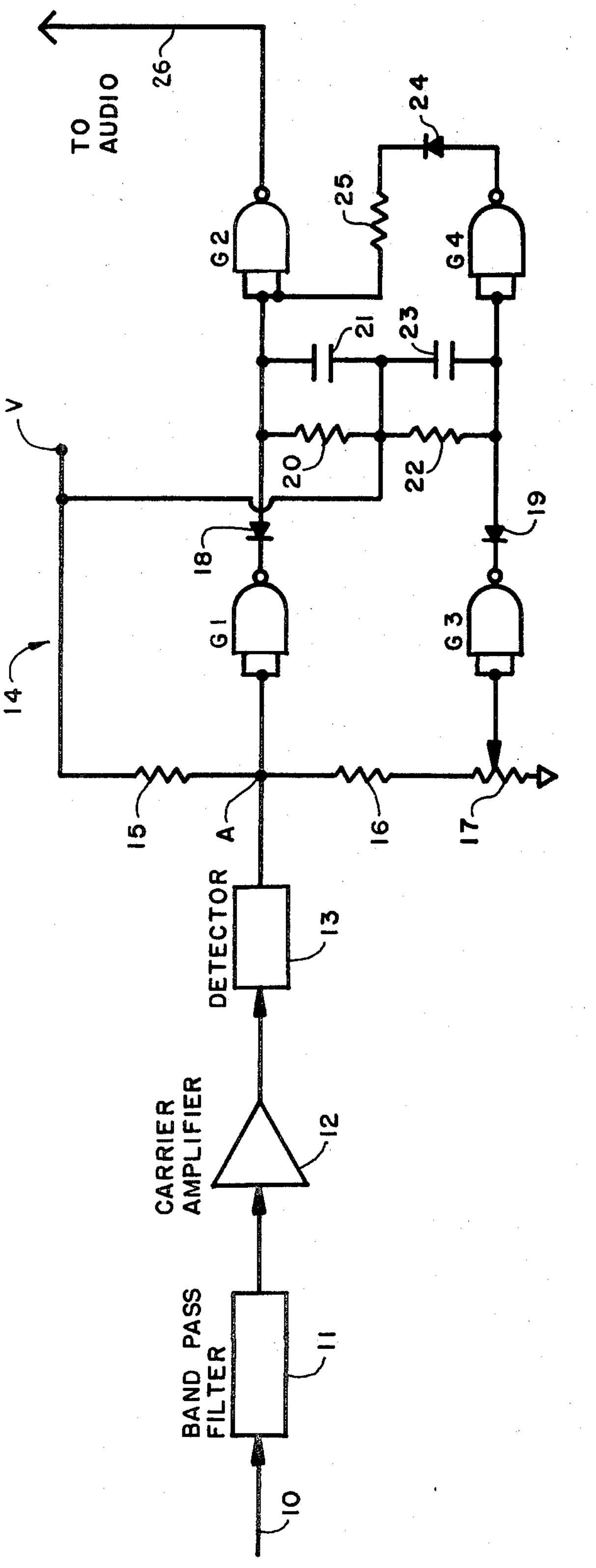

This invention relates to squelch circuitry used in radio receivers to cut out noise between intervals of signal intelligence transmission, and is directed particularly to improvements on such circuits wherein the squelch time delay is made a function of signal level or signal strength.

In radio receivers, particularly in high gain communication receivers, it is common practice to employ squelch circuits operative to automatically block off the audio output in the absence of transmitted signal intelligence or carrier modulation so that annoying receiver noise will not be heard during intervals between signal reception. Upon the resumption of a signal being received after an interval of silence, the squelch circuit opens the audio path again, allowing the signal to be heard for as long as it is present. Such squelch circuits as have heretofore been devised, however, are deficient in various respects, principally in that they operate with an inherent constant time delay. In mobile radio communication, particularly when either or both of mobile transmitting and receiver units are moving, the level of signal reaching the receiver varies up and down rapidly, such rapid variation being commonly referred to as "rapid flutter". Such rapid signal strength variation is also frequently caused by atmospheric conditions. In squelch circuits heretofore devised, a long decaying time constant is utilized to permit the signal to vary up and down rapidly before the squelch has had time to operate, thereby avoiding chopping of the signal being received in the presence of rapid flutter. While such use of a long time delay effectively prevents loss of signal or partial loss of signal under conditions of rapid flutter, there is the disadvantage that when signals are at a substantially constant strong level, as is usually the case, a long noise tail is heard at the end of each transmission interval before the squelch circuitry has had time to operate.

It is, accordingly, the principal object of this invention to provide a novel and improved squelch circuit wherein the time delay inherent in its operation is variable as a function of signal level, so as to provide a long decaying time constant when signal levels are weak, and sustantially instantaneous shut-off or squelch when signals are strong, and thereby providing for uninterrupted signal reception under rapid flutter conditions, while at the same time eliminating the annoying squelch time delay noise tail under normal signal conditions.

Another object of the invention is to provide a signal-level-controlled radio receiver squelch circuit of the character described that is readily adaptable for use with any type of receiver, whether AM, FM, SSB, etc., wherein the squelch is operated either on random receiver noise or signal carrier.

Still another object of the invention is to provide a signal level control squelch circuit of the above nature which will be simple in design, economical to manufacture, compact, durable, and dependable in performance.

Figure 2:
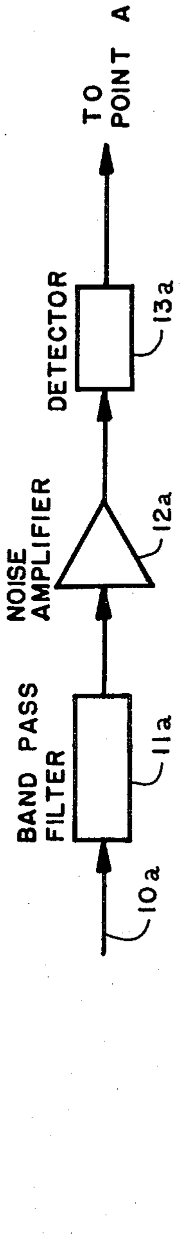

Other objects, features and advantages of the invention will be apparent from the following description when read with reference to the accompanying drawing. In the drawing:

FIG. 1 is a schematic diagram of a squelch circuit embodying the invention, the same being shown as being fed by the output of an amplitude modulated or single side-band receiver, output stages of which are illustrated in block form; and FIG. 2 illustrates, separately and in block form, the output stages of a typical FM or frequency modulation receiver, the output of which can be fed to the squelch circuitry of FIG. 1 in lieu of the output stages of an FM or SSB receiver for squelch operation.

Referring now in detail to FIG. 1 of the drawing, it is first to be noted that the squelch signal from the receiver, indicated at 10 in FIG. 1 and which will be carrier signal in the case of AM or SSB receivers, is fed through a band-pass filter 11, the output of which is amplified in a carrier amplifier 12, which output in turn, is fed to the input of a detector stage 13. The output of the detector 13, indicated at A, will be a rectified noise voltage proportional to the carrier level, and thus proportional to signal strength, and is used to operate the squelch circuit comprising the invention.

The squelch circuit embodying the invention and designated, generally, by reference numeral 14 is applied directly to the input of a first NAND gate G1 and to the input of a second NAND gate G3 through a voltage divider circuit comprising series-connected load resistor 15, fixed resistor 16 and potentiometer 17, said voltage divider circuit being connected between supply voltage V and ground. The input bias voltage of the NAND gate G1 will thus always be greater than that of the second NAND gate G3. The first NAND gate G1 will therefore operate at a lower threshold of input signat at point A than the second NAND gate G3. The outputs of the first and second NAND gates G1, G3 are fed to the inputs of a pair of NAND output gates G2 and G4, respectively, through diodes 18 and 19. The input of NAND gate G2 is also connected to supply voltage V through an RC time delay circuit comprising resistor 20 and condenser 21; and the input of NAND gate G4 is similarly connected to supply voltage V through a relatively short time delay circuit comprising parallel-connected resistor 22 and condenser 23. The output of the NAND gate G4 is returned to the input of NAND gate G2 through series-connected diode 24 and resistor 25. The output of the NAND gate G2, indicated at 26, comprises the squelch control signal for the receiver audio. This signal will be utilized to control a gate circuit (not illustrated) operative to pass or shut off the audio signal from the receiver to the speaker.

The operation of the squelch circuit 14 will first be considered when no communication signal is present at input point A. Under such conditions, the input to both NAND gates G1 and G3 will be zero and their outputs high. The outputs of the NAND output gates G2 and G4, thus being provided with high inputs from their respective NAND gate G1 and G3, will therefore both be zero, so that the audio path is cut off or squelched. Since the diode 24 in the series circuit between the output of NAND gate G4 and the input to NAND gate G2 is back-biased, said series circuit is of no effect under this "no signal" condition of circuit operation.

Considering next the operation of the squelch circuit when a weak signal is present at input point A, the input to the NAND gate G1 will be high enough to actuate the first gate, so that its output will be brought to substantially zero potential. Under this condition the time delay circuit comprising resistor 20 and condenser 21 will be charged to supply potential through diode 18. The input of NAND gate G2, also brought to zero potential by actuation of NAND gate 1, results in high output at 26, serving to open the audio circuit and permitting signals to reach the speaker. Under this condition of operation the signal input to the second NAND gate G3 will be at somewhat lower than threshold level, depending upon the setting of the potentiometer 17, so that, as in the case with no input signal as described above, the output of the NAND gate G3 and the input of the NAND gate G4 will remain high, keeping the output of the NAND gate G4 at zero potential. Thus, when the signal being received ceases, the previously charged condenser 21 of the main time delay circuit discharges through resistor 20 thereby temporarily keeping the input NAND gate G2 at low enough potential to retain the audio path to the receiver open. The values of the resistor 20 and the condenser 21 comprising the main time delay circuit are chosen to have a time constant long enough to prevent signal chopping under weak and varying input signal conditions, including flutter conditions as hereinabove described.

Under strong input signal conditions, that is, when a strong detected radio noise signal is present at input point A of the squelch circuit, not only will the input to the NAND gate G1 be brought high enough to actuate this first gate, but signal strength will be at a level above the threshold signal value at the input of the second gate G3 to effect its actuation, whereby the outputs of both said first and second gates will be brought substantially to zero potential. Under such conditions, not only will the main time delay circuit comprising condenser 21 and resistor 20 be charged to supply potential, as described above, but the auxiliary time delay circuit comprising resistor 22 and condenser 23 will also be charged to supply potential returned to zero or ground potential through diode 19. The output of the NAND gate G2 indicated at 26 will be high, to effect passage of the receiver audio signal to the loudspeaker. At this time the output of the NAND gate G4 will also be at high potential, substantially the same potential as supply voltage V, which serves, in effect, to shunt the comparatively low value resistor 25 with resistor 20 of the main time delay circuit comprising said resistor and condenser 21. This, in turn, substantially shortens the time constant of the main time delay circuit 20, 21, so that when the signal being received is discontinued or ceases, the decay interval before the NAND gate G2 is brought to a high enough level again at its input for turning off or squelching the audio output will be substantially reduced, thereby eliminating the usual annoying long interval noise tail trailing the end of each period of signal or intelligence transmission. The potential charge afforded the condenser 23 of the auxiliary time delay circuit comprising said condenser and resistor 22 serves as a memory device preventing NAND gates G2 and G4 becoming deactuated at the same time upon discontinuance of signal at input point A, and thereby providing enough time for the main time delay circuit, now comprising condenser 21 and resistors 20 and 25, to control squelch operation as described above. In this connection, it is to be noted that the capacity of the condenser 23 is about one fifth of that of the condenser 21 so that, upon discontinuance of signal at signal input point A, discharge of condenser 23 through the associated shunt resistance network comprising resistors 20, 22 and 25 will require substantially less time than the discharge therethrough of condenser 21.

FIG. 2 illustrates how the output of an FM radio receiver can be utilized in combination with the squelch circuit embodying the invention. The output of the FM receiver, which will be at high noise level under no-signal conditions, is fed through a band-pass filter 11*a*, the output of which is amplified in a noise amplifier 12*a* which output, in turn, is fed to the input of a detector stage 13*a*. The output of the detactor stage 13*a* will be a rectified noise voltage proportional to incoming signal strength, which can be supplied at point A of FIG. 1 in lieu of the abovedescribed AM output and detector stages 11, 12 and 13 to operate the squelch circuit. Operation of the squelch circuit is otherwise similar in all respects to the description given above for its operation with AM or SSB radio receivers.

As an aid to those who may wish to practice the invention, the following values of circuit elements are given as having been found to be effective in circuit operation under practical radio reception conditions:

| RESISTORS | CONDENSERS |
|---|---|
| 15 15,000 ohms | 21 0.47 mfd. |
| 17 0.5 megohms | 23 0.1 mfd. |
| 20 2.2 megohms | |
| 22 2.2 megohms | |
| 25 4,700 ohms | |

While I have illustrated and described herein only one basic form in which my invention can conveniently be embodied in practice, it is to be understood that this embodiment is given by way of example only, and not in a limiting sense. The invention, in brief, comprises all the embodiments of the modifications coming within the scope and spirit of the following claims.

What I claim as new and desire to secure by Letters Patent is:

1. A radio receiver squelch circuit with time constant controlled by signal level comprising, in combination, a first and a second input gate means, signal voltage divider means for feeding rectified signal noise of a common incoming radio signal at respective high and low levels to said first and second input gate means to render said first input gate means operative at a lower input signal level than said second input gate means, a high output level gate means and a low output level gate means, the distinctive outputs of said first and second input gate means being fed, respectively, to said high and low output level gate means, the output of said high output level gate means being operative to squelch the received radio signal, a source of DC supply voltage for energizing each of said gate means, the output of said first input gate means including an RC time delay circuit operative to be charged to said supply voltage upon the feeding of a noise signal of any level to the input of said first input gate means, the output of said second input gate means comprising a series resistor circuit operative to be connected in parallel with said RC time delay circuit upon the feeding of a noise signal to said first and second input gate means providing an input level to said second input gate means above a certain minimum threshold value.

2. A radio receiver squelch circuit as defined in claim 1, wherein said first and second input gate means and said high output level gate means and said low output level gate means each comprises a NAND gate.

3. A radio receiver squelch circuit as defined in claim 2, wherein the output of said first input gate is fed directly to the inputs of said high output level gate through a first diode, and wherein the output of said second input gate is fed directly to the inputs of said low output level gate through a second diode.

4. A radio receiver squelch circuit as defined in claim 3, wherein said series resistor circuit comprises a diode and a resistor connected in series between the output of said low output level gate and the inputs of said high output level gate.

5. A radio receiver squelch circuit as defined in claim 4, including a second RC time-delay circuit in the output of said second input gate and having a substantially smaller time constant than said first mentioned RC time-delay circuit, said last mentioned time-delay circuit serving as a memory device preventing said high and low output level gates becoming deactuated at the same time upon discontinuance of signal noise, and thereby providing enough time for said first mentioned RC time-delay circuit parallel-connected with said series resistor to control the output of said high output level gate.

6. A radio receiver squelch circuit as defined in claim 5, wherein said signal voltage divider means comprises a potentiometer for variably adjusting the difference in input noise level to said second input gate.

* * * * *